US009442908B2

(12) United States Patent
Siegel (10) Patent No.: US 9,442,908 B2
(45) Date of Patent: Sep. 13, 2016

(54) METHOD AND COMPUTING DEVICE FOR FACILITATING REVIEW OF A DOCUMENT (71) Applicant: WORKIVA INC., Ames, IA (US)

(72) Inventor: Stephen M. Siegel, Ames, IA (US)

(73) Assignee: Workiva Inc., Ames, IA (US)

( * ) Notice: Subject to any disclaimer, the term of this patent is extended or adjusted under 35 U.S.C. 154(b) by 268 days.

(21) Appl. No.: 14/305,172

(22) Filed: Jun. 16, 2014

(65) Prior Publication Data
US 2015/0365298 A1 Dec. 17, 2015

(51) Int. Cl.
*G06F 17/00* (2006.01)
*G06F 17/22* (2006.01)
*G06Q 10/10* (2012.01)

(52) U.S. Cl.
CPC ......... *G06F 17/2288* (2013.01); *G06Q 10/103* (2013.01)

(58) Field of Classification Search
CPC .................................................. G06F 17/2288
USPC ....................................................... 715/229
See application file for complete search history.

(56) References Cited

U.S. PATENT DOCUMENTS

| | | | | |
|---|---|---|---|---|
| 6,088,702 A * | 7/2000 | Plantz | ...................... | G06F 17/24 |
| 6,263,340 B1 * | 7/2001 | Green | ...................... | G06F 21/31 |
| 6,912,660 B1 | 6/2005 | Petrogiannis | | |
| 7,111,230 B2 | 9/2006 | Euchner et al. | | |
| 7,167,844 B1 * | 1/2007 | Leong | ................... | G06Q 30/04 |
| | | | | 705/37 |
| 8,082,277 B1 | 12/2011 | O'Brien et al. | | |
| 8,255,800 B2 | 8/2012 | Moore et al. | | |
| 8,442,920 B1 | 5/2013 | Rakowicz et al. | | |
| 8,504,827 B1 | 8/2013 | Sizer et al. | | |
| 8,583,705 B2 | 11/2013 | Foygel et al. | | |
| 8,587,613 B2 | 11/2013 | Wang et al. | | |
| 8,595,628 B2 | 11/2013 | Bayari et al. | | |
| 8,612,845 B2 | 12/2013 | Nelson et al. | | |
| 2002/0019838 A1 * | 2/2002 | Petrogiannis | ................. | 707/530 |
| 2002/0095399 A1 * | 7/2002 | Devine | ............... | G06F 17/3089 |
| 2003/0188263 A1 * | 10/2003 | Bates | ................ | G06F 17/30884 |
| | | | | 715/206 |
| 2004/0122898 A1 * | 6/2004 | Srinivasa | ................ | H04L 67/38 |
| | | | | 709/205 |
| 2004/0205631 A1 * | 10/2004 | Keohane | ........... | G06F 17/30899 |
| | | | | 715/273 |
| 2005/0120294 A1 * | 6/2005 | Stefanison | ............. | G06Q 10/10 |
| | | | | 715/223 |
| 2009/0157711 A1 * | 6/2009 | Baer et al. | ..................... | 707/101 |
| 2009/0217196 A1 * | 8/2009 | Neff | ....................... | G06Q 10/10 |
| | | | | 715/799 |
| 2010/0017223 A1 * | 1/2010 | Johnson | ................. | G06Q 50/22 |
| | | | | 705/2 |
| 2010/0095203 A1 * | 4/2010 | Toebes et al. | ................ | 715/277 |

(Continued)

OTHER PUBLICATIONS

Adobe Systems Incorporated, "Adobe Acrobat 9 Digital Signatures, Changes and Improvements", Apr. 1, 2009, pp. 1-15.

(Continued)

*Primary Examiner* — Laurie Ries
(74) *Attorney, Agent, or Firm* — Drinker Biddle & Reath LLP (57) ABSTRACT

A method, carried out by a computing device, includes displaying a summary of the sections of a document, identifying one or more sections that have been previously reviewed by a particular reviewer, but has changed since the reviewer last reviewed it, indicating the availability of a blacklined version of the section, and identifying the revision against which the blacklined version has been compared. The computing device may also identify sections that have not been reviewed, sections that have been reviewed and approved by the reviewer (including which revision was approved), and sections that have been reviewed but not approved.

14 Claims, 8 Drawing Sheets

(56) References Cited

U.S. PATENT DOCUMENTS

| | | | |
|---|---|---|---|
| 2011/0093471 A1* | 4/2011 | Brockway | G06F 17/30616 707/747 |
| 2012/0209803 A1* | 8/2012 | Napierala, II | 707/608 |
| 2012/0233554 A1 | 9/2012 | Vagell et al. | |
| 2013/0185657 A1* | 7/2013 | Gunawardena | G06F 17/30038 715/753 |
| 2013/0262373 A1 | 10/2013 | Rampson | |
| 2013/0283147 A1 | 10/2013 | Wong et al. | |
| 2014/0032486 A1 | 1/2014 | Sharma et al. | |
| 2014/0115436 A1* | 4/2014 | Beaver et al. | 715/229 |
| 2014/0317147 A1* | 10/2014 | Wu | G06Q 50/18 707/792 |

OTHER PUBLICATIONS

Barclay, Cameron A., "Microsoft Word Track Changes", May 2010, pp. 1-27, The University of Tennessee Health Science Center, Memphis, TN.

* cited by examiner

METHOD AND COMPUTING DEVICE FOR FACILITATING REVIEW OF A DOCUMENT

TECHNICAL FIELD

The present disclosure is related generally to electronic document review and, more particularly, to a method and computing device for facilitating review of a document.

BACKGROUND

Countless professionals spend most, if not all, of their working hours creating and editing documents that require the approval of multiple reviewers before being considered "done." A typical review cycle proceeds as follows. The author creates a draft document (e.g. using one of the Microsoft Office® applications), emails the draft around to the reviewers, receives feedback, revises the document, and emails the revised document to the reviews. This process continues for as many cycles as needed until all of the reviewers have approved the document. Very often, however, one or more of the reviewers will fall behind the other reviewers, and end up not reviewing the document until multiple revisions have already been made. As a result, that reviewer may receive a document that has been marked up against an earlier version that the he or she has not even seen before, which makes the mark-ups useless to that reviewer. Furthermore, not all of the reviewers will be interested in the same sections of the document. For example, if the document is a Form 10-Q, one reviewer might be interested only in a particular note regarding intangibles while another reviewer may focus on the overall financial statements. In order to determine whether a particular section of the document has been revised, a reviewer may need to skim through parts of the document that are not important to that reviewer.

DRAWINGS

While the appended claims set forth the features of the present techniques with particularity, these techniques, together with their objects and advantages, may be best understood from the following detailed description taken in conjunction with the accompanying drawings of which:

DESCRIPTION

The disclosure is generally directed to a method for facilitating document review that provides an individualized review summary to each reviewer. In an embodiment, the method, carried out by a computing device, includes displaying a summary of the sections of the document, identifying one or more sections that have been previously reviewed by a particular reviewer, but has changed since the reviewer last reviewed it, indicating the availability of a blacklined version of the section, and identifying the revision against which the blacklined version has been compared. The computing device may also identify sections that have not been reviewed, sections that have been reviewed and approved by the reviewer (including which revision was approved), and sections that have been reviewed but not approved.

According to another embodiment, a server identifies the last revision of a document section reviewed by one of multiple reviewers, compares the last reviewed revision of the section to a current revision of the section, and generates a blacklined version of the section based on the comparison. The server provides a user interface (e.g., remotely over a network) that identifies the section as having previously been reviewed and changed, indicates the availability of the blacklined version, and identifies the revision against which the blacklined version is compared. The server may generate a user interface for each reviewer, which allows each reviewer to see the reviewer's own review history of the document.

Figure 1:
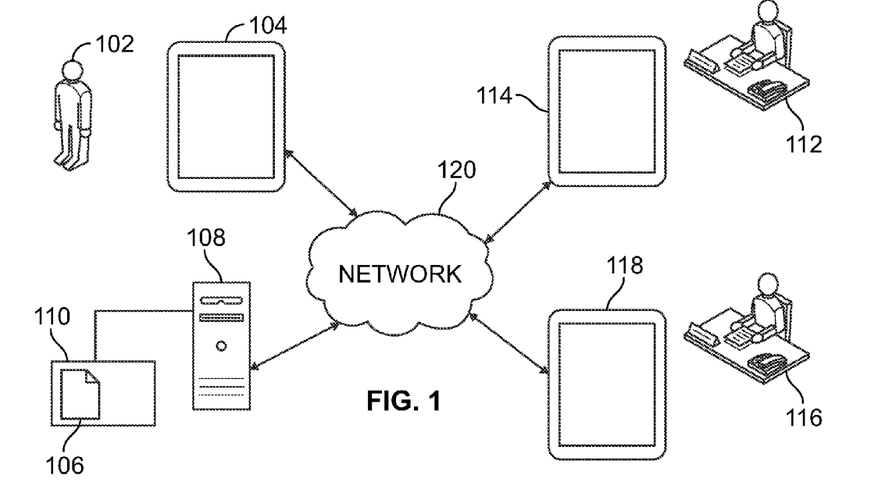
FIG. 1 is an example of a networking environment in which various embodiments may be used.

Turning to FIG. 1, a document editor ("editor") 102 uses a computing device 104 to edit a document 106 that is hosted on a server 108. The primary copy of the document 106 is stored in a memory 110 (which may be volatile or non-volatile) of the server 108. A first reviewer 112 uses a computing device 114 to review the current revision of the document 106. Similarly, a second reviewer 116 uses a computing device 118 to review the current revision of the document 106. The respective computing devices communicate with the server 108 over a network 120 (e.g., a local area network, wide area network, wired network, wireless network, or the Internet). Any number of editors and reviewers is possible, however, and the number shown in FIG. 1 is only meant to be illustrative. Although the computing devices 104, 114, and 118 of FIG. 1 are depicted as tablet computers, they may be implemented as any sort of computing device, including rack-mounted servers, desktop computers, notebook computers, or smartphones.

Figure 2:
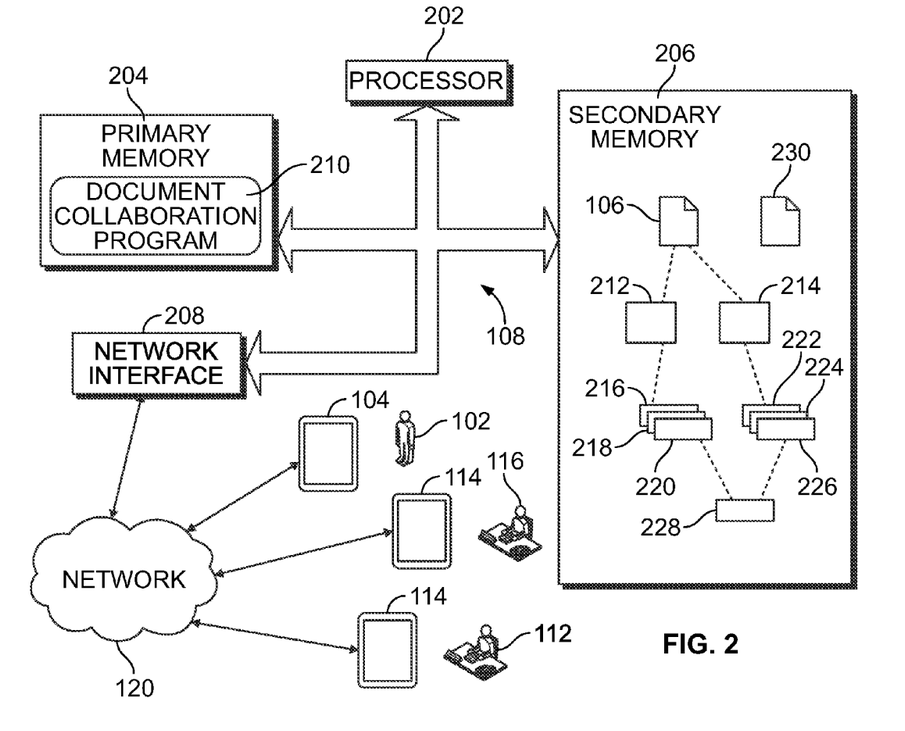
FIG. 2 shows a possible implementation of a server according to an embodiment.

Turning to FIG. 2, a possible implementation of the server 108 is a computing device (e.g., rack-mounted server, desktop computer, notebook computer, tablet, or smartphone) that includes a processor 202, a primary memory 204 (e.g., volatile memory, random-access memory), a secondary memory 206 (e.g., non-volatile memory, hard disk memory), and a network interface 208. The memories 204 and 206 store instructions and data. The processor 202 executes the instructions (such as a document collaboration program 210) and uses the data to carry out various procedures including, in some embodiments, the methods described herein. The server 108 in general and the processor 202 in particular are able to communicate with the computing devices 104, 114, and 118 of FIG. 1 via the network interface 208 over the network 120. Although the term "server" is used, the server 108 does not necessarily have to be in a formal server-client relationship with the computing devices 104, 114, and 118. The server 108 may be a client to one or more of the computing devices 104, 114, and 118, or may be a peer to these devices.

Continuing with FIG. 2, the document 106 is stored in the secondary memory 206 of the server 108. The document 106 is associated with multiple data structures, two of which (212 and 214) are depicted in FIG. 2. Each data structure will referred to as a "DocumentRevision." Each DocumentRevision represents a version of the document 106 at a particular point in time. Each DocumentRevision has a number of sections. For example, the first DocumentRevision 212 has sections 216, 218, and 220, while the second DocumentRevision 214 has sections 222, 224, and 226. Each section is independently reviewable.

Figure 3:
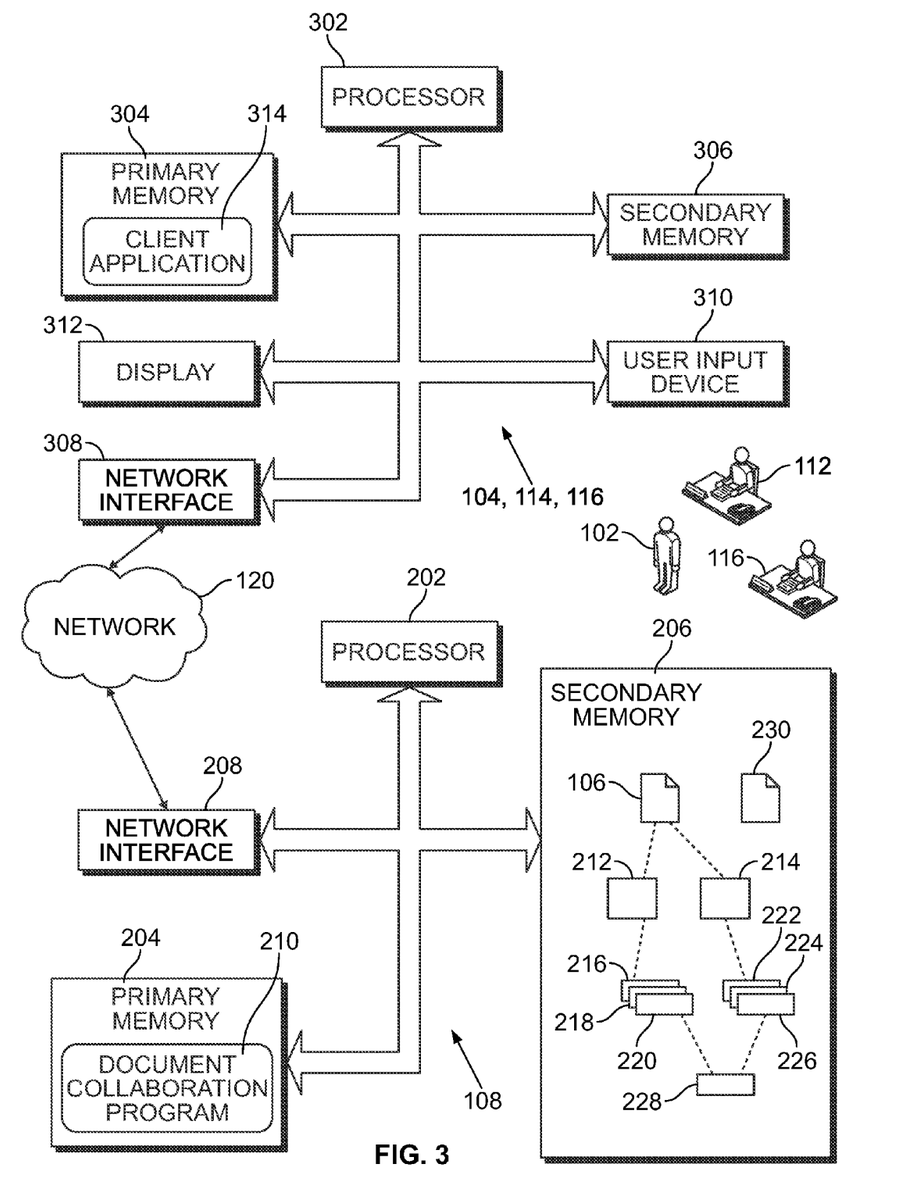
FIG. 3 shows a possible implementation of a computing device according to an embodiment.

Turning to FIG. 3, a possible implementation of one or more of the computing devices of FIG. 1 includes a processor 302, a primary memory 304 (e.g., volatile memory, random-access memory), a secondary memory 306 (e.g., non-volatile memory), a network interface 308 (which may be wired or wireless), a user input device 310 (e.g., a keyboard, mouse, or touchscreen), and a display 312 (e.g., an organic, light-emitting diode display). The memories 304 and 306 store instructions and data. The processor 302 executes the instructions, such as those of a client application 314, and uses the data to carry out various procedures including, in some embodiments, the methods described herein. The computing device in general and the processor 302 in particular are able to communicate with the server 108 of FIG. 1 via the network interface 308 over the network 120.

To edit the document 106, the editor 102 uses the computing device 104 to execute the client application 314, which logs onto the server 108 (i.e., onto the document collaboration program 210 executing on the server 108). The server 108 provides instances of the one or more sections of a DocumentRevision to the computing device 104, which the client application 314 displays to the editor 102 on the display 312. The editor 102 interacts with the computing device 104 via the user input device 310 to edit one or more sections of the DocumentRevision. In response to the user interaction, the processor 302 of the computing device 104 transmits those edits back to the server 108. The server 108 updates the DocumentRevision to reflect the edits. Additionally, the client application 314 may, in response to input from the editor 102, request the creation a new version of the document 106. To create the new version, the client application 314 transmits the request to the server 108, which responds by creating a new DocumentRevision.

Once the editor 102 is ready to have the document 106 reviewed, the editor 102 interacts with the client application 314 to indicate to the server 108 that the document 106 (i.e., the latest revision of the document 106) is ready to be reviewed. In one embodiment, the editor 102 executes a web client on the computing device 104, logs into the server 108, and, using a web page provided by the server 108, indicates that the document 106 is ready to be reviewed. In response, the server 108 (running the document collaboration program 210) informs the computing devices 114 and 118 (e.g., via email) that the latest revision of the document 106 is available to be reviewed.

In an embodiment, the processor 202, when executing the document collaboration program 210, can generate a blacklined version of any given section of a revision of the document 106, and do so on a per-reviewer basis. To do so, the server 108 keeps track (e.g., in a data structure in the secondary memory 206) of which section and which revision of the section each reviewer has reviewed and approved. The server 108 uses this historical revision information to generate a blacklined version of one or more sections for each reviewer. For the blacklined versions of the sections, any given reviewer may have different revisions being compared in each section. For example, assume that a document has a first section and a second section. A reviewer might have a blacklined version of the first section of the document that compares Revision 1 of the first section with Revision 4 of the first section, but have a blacklined version of the second section that compares Revision 3 of the second section with Revision 4 of the second section.

According to an embodiment, the processor 202, when executing the document collaboration program 210, can provide different blacklined versions for the same section to different reviewers, and indicate the availability of these different blacklined versions on each reviewer's user interface in a different way. For example, assume that the editor 102 makes edits to sections of the document 106, which the processor 202 receives via the network interface 208 and the network 120 from the computing device 104 (remotely located in this example). The processor 202 creates a blacklined version of each of the sections, assembles a first user interface for the first reviewer 112 and a second user interface for the second reviewer 116. On the first user interface, the processor 202 inserts a visual indicator for each section that the editor 102 edited. The visual indicator indicates whether or not the section has been changed since the first reviewer 112 approved the section, the identity of the version of the section that the first reviewer 112 approved, the availability of a blacklined version of the section, and the identities of the revisions of the section being compared in the blacklined version. The processor 202 inserts a similar visual indicator in the second user interface. The processor 202 then transmits the first user interface to a first computing device 114 and the second user interface to the second computing device 118 over the network 102 via the network interface 208.

Continuing with the example, the processor 202 receives, from the first computing device 114 over the network 102 via the network interface 208, an indication that the first user 112 has approved a section of the plurality of sections (e.g., has checked a box next to the section heading). The processor 202 updates a visual indicator associated with the approved section on the first user interface to reflect the first user's approval. The processor may also receive such an indication regarding the second user 116, and update the second user interface similarly.

Extending the example, the processor 202 receives a first set of edits from the editor 102 to a particular section and creates a first revision of the section based on the first set of edits. The processor 202 receives, from the first reviewer 112, an approval of the first revision of the section. Then, the processor 202 receives a second set of edits from the editor 102 to the first revision of the section and creates a second revision of the section based on the second set of edits. The processor 202 then receives, from the second reviewer, an approval of the second revision of the section. Finally, the processor 202 receives a third set of edits from the editor 102 to the second revision of the section and creates a third revision of the section based on the third set of edits. At this point, the processor can visually indicate on the first user interface (i.e., for the first user 112) the availability of a first blacklined version of the section, which compares the first revision with the third revision. The processor can also visually indicate, on the second user interface, the availability of a second blacklined version of the section that compares the second revision with the third revision. As noted above, the processor 202 would transmit the first user interface and the second user interface (or updates thereto) to the first computing device 114 and second computing device 118 respectively. Thus, the first reviewer 112 and the second reviewer 116 would each have a customized view of the review status of the document, each view reflecting the individual's review history and relevant blackline for that particular section.

Figure 4:
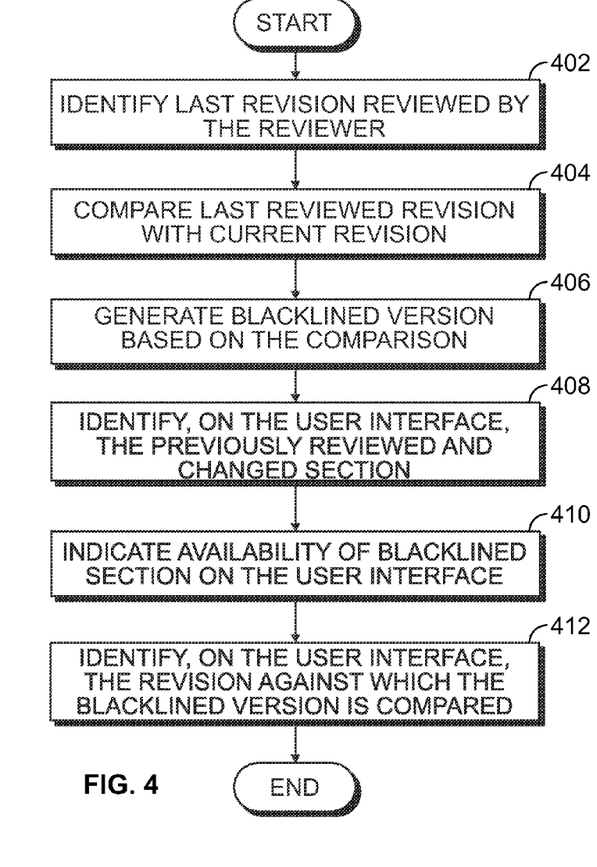
FIG. 4 is a flowchart that shows steps carried out by the server in an embodiment.

Referring to FIG. 2 and FIG. 4, an example of how this process may occur will now be described. It will be assumed that the first reviewer 112 has previously reviewed and approved a section entitled "Note 1—Accounting" in Revision 14 of the document 106, and the current revision of the document 106 is Revision 23. The server 108 identifies the last revision that the first reviewer 112 reviewed (step 402), which is Revision 14. The server 108 compares the section 220 of the DocumentRevision data structure 212 (for Revision 14) and the section 226 of the DocumentRevision data structure 214 (for Revision 23) (step 404). Based on this comparison, the server 108 generates a blacklined version 228 of the section (step 406). The server 108 generates a summary of the sections of the current revision of the document 106 (e.g., a list of section titles), identifies the previously-reviewed-but-changed section in the summary (step 408) by a visual indication (e.g., by specifying a red font for that section's title), indicates the availability of the blacklined version 228 (step 410) (e.g., by inserting a note next to the title), and identifies the revision against which the blacklined version 228 is being made (step 412) (e.g., by inserting a note in the title). The server 108 provides the blacklined version 228 to the first reviewer's computing device 114. The blacklined version 228 shows the changes that have occurred in the section between the Revision 14 (section 220) and Revision 23 (section 226). The blacklined version 228 includes underlined text (indicating text that has been added) strikethrough text (indicating text that has been deleted). There are other steps that may be carried out as well, which will be discussed in further detail below. For example, the server 108 may also identify previously-reviewed-and-unchanged sections as well as not-yet-reviewed sections using other visual indications such as headings having other colored fonts.

Although the term "blacklined" is used herein, this disclosure is not limited to that particular change-tracking mechanism. The blacklined version may use other editing devices besides underlining and striking-through to indicate changes, such as different color fonts, different types of fonts, brackets, parenthesis, etc. The server 108 may generate blacklined versions of sections for each reviewer each time a new revision of the document 106 is released by the editor 102 or may wait until a reviewer requests a particular section and generate the blacklined version at the time of the request. Additionally, the server 108 may detect changes to a reviewer's previously-reviewed sections and notify the reviewer of the changes.

Figure 5A:
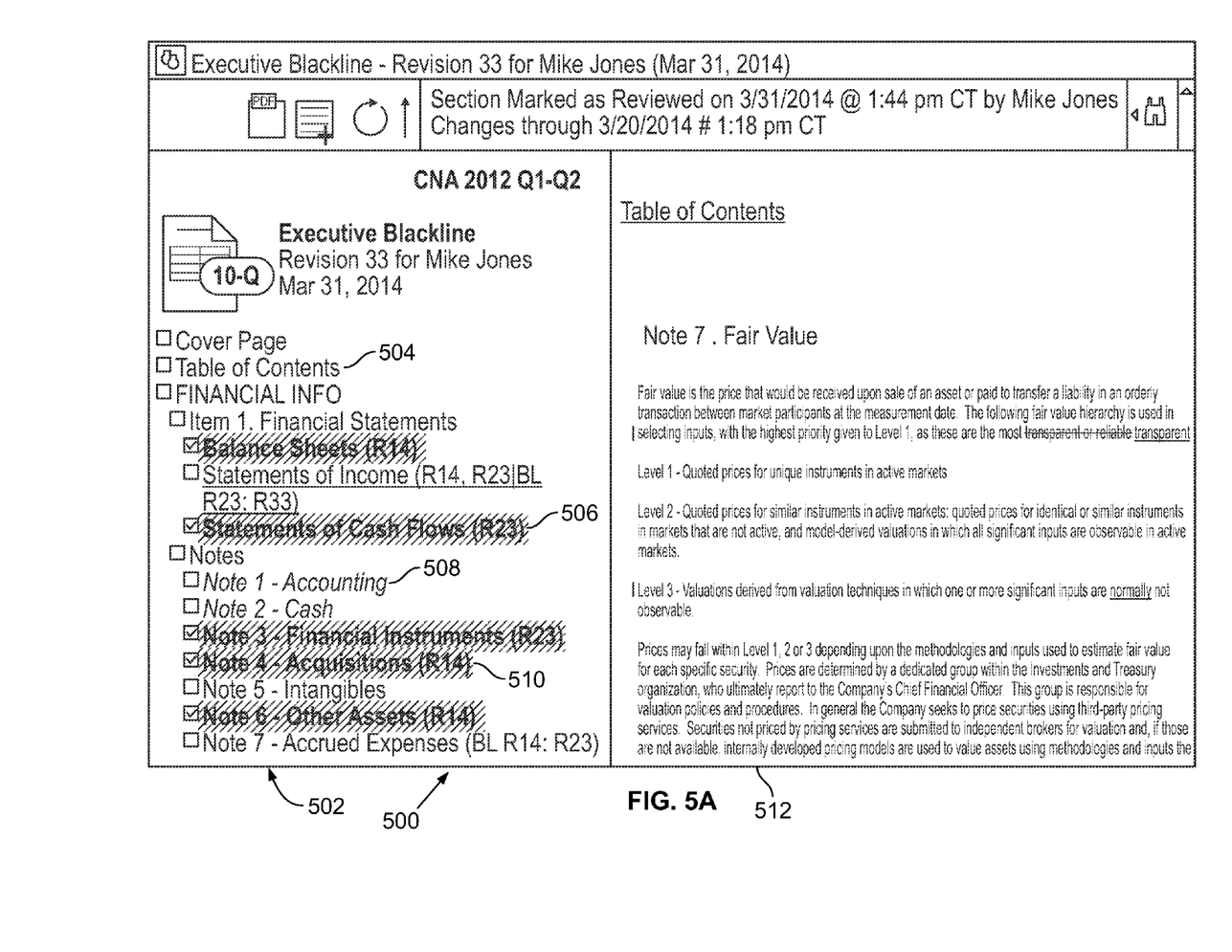
FIG. 5A and FIG. 5B show a user interface according to an embodiment.

Turning to FIG. 5A, In one embodiment, the server 108 presents (either directly or remotely via one of the computing devices) a user interface 500, which includes a document section summary 502 in the left pane. The document section summary 502 lists each section of the current revision of the document 106 and indicates the review status and approval status of each section with respect to a particular reviewer. The review status, the approval status, and the availability of a blacklined version may be indicated in a variety of ways with visual indicators. In FIG. 5A, the following visual indicators are used:

- A. The section title in regular font (e.g., the Table of Contents section 504) indicates that the reviewer has reviewed (though not necessarily approved) the section.
- B. The section title in italic font (e.g., Statement of Cash Flows section 506) indicates that the current version of the section has not been reviewed by that reviewer yet (e.g., because it is either new or has been updated since the last time that the reviewer reviewed the section).
- C. A section title that is underlined (e.g., Note 1—Accounting section 508) indicates that a prior version of the section was previously reviewed and approved, but has since been changed. A note in parenthesis next to the section title indicates which version or versions the reviewer had previously reviewed, and may indicate that a blackline ("BL") against the previously-reviewed version is available.
- D. A section title in bold font on a line-filled background with a check inside the box (e.g., Note 4—Acquisitions section 510) indicates that the section has previously been reviewed and approved, and has not been changed since that approval. A note in parenthesis next to the section title indicates which version the reviewer had reviewed and approved.

The section titles may convey the review status and the availability of blacklined versions in other ways according to other embodiments. For example, indicators A, B, C, and D listed above could be shown visually in the section summary 502 by displaying the section title in A. dark blue font, B. light blue font C. a red font, and D. gray font with a box checked. Other possible visual indicators include displaying (e.g., near the section title) different icons or different graphics representing different review statuses, approval statuses, and availability of blacklined versions.

Figure 6:
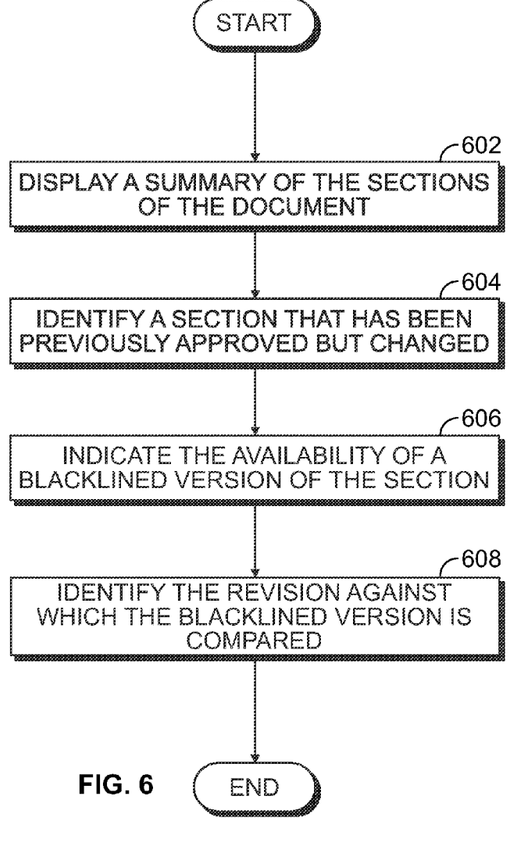
FIG. 6 is a flowchart that shows steps carried out by a computing device in an embodiment.

The process carried out when a reviewer reviews a current revision (represented by the DocumentRevision data structure 214) of the document 106 in an embodiment will now be described with reference to the flowchart FIG. 6 (with appropriate reference to FIG. 3), using the first reviewer 112 as an example. The first reviewer 112 executes the client application 314 on the first reviewer's computing device 114. The computing device 114 requests a document section summary from the server 108. In response to the request, the server 108 transmits the document section summary to the computing device 114 via the network 120. The computing device 114 displays the section summary on the display of the computing device 114. More specifically, the computing device 114 displays a summary of the sections of the document (step 602) (e.g., displays a list of section titles). The computing device 114 identifies a section that has been previously approved by the user, but changed (e.g., with a visual indication such as by rendering the title of that section in red font) (step 604), indicates the availability of a blacklined version of that section (step 606), and identifies the revision against which the blacklined version is compared (step 608) (e.g., with a visual indication such as a parenthetical note next to the title).

To review the changed section (or any other section), the first reviewer 112 selects the section (e.g., clicks on the title of the section in the section summary 502 of FIG. 5A). In response to the selection, the client application 314 transmits a request to the server 108 for the selected section, which is assumed to be the section 226 in this example.

If the first reviewer 112 has not previously reviewed that section, or if the first reviewer 112 has previously reviewed the section, but the section has not changed since that time, the server 108 (executing the document collaboration program 210) provides a clean copy of the section 226 (i.e., the current revision) to the computing device 114. The computing device 114, under the control of the client application 314, displays the clean copy of the section 226 to the first reviewer 112 on the display 312.

If the first reviewer 112 has previously reviewed the section 226, but the section 226 has been changed since then, the server 108 provides (or offers to provide) a copy of a blacklined version 228 to the computing device 114. The blacklined version 228 of the section 226 is generated using the process described above. The server 108 may have generated the blacklined version 228 prior to the user selecting the section or may do so in real time. The computing device 114 displays the blacklined version.

The following is a more specific example of how the document 106 (FIG. 1) is edited, reviewed, and revised in accordance with an embodiment of the disclosure. In this example, the document is a 10-Q, and includes the following sections: a Cover Page section, a Table of Contents section, and a FINANCIAL INFO section. The FINANCIAL INFO section has two sections: Item 1: Financial Statements and Notes. The Item 1: Financial Statements section has the following sections: Balance Sheets, Statements of Income, and Statements of Cash Flows. The Notes section has the following sections: Note 1—Accounting, Note 2—Cash, Note 3—Financial Instruments, Note 4—Acquisitions, Note 5—Intangibles, Note 6—Other Assets, and Note 7—Accrued Expenses.

Figure 5B:
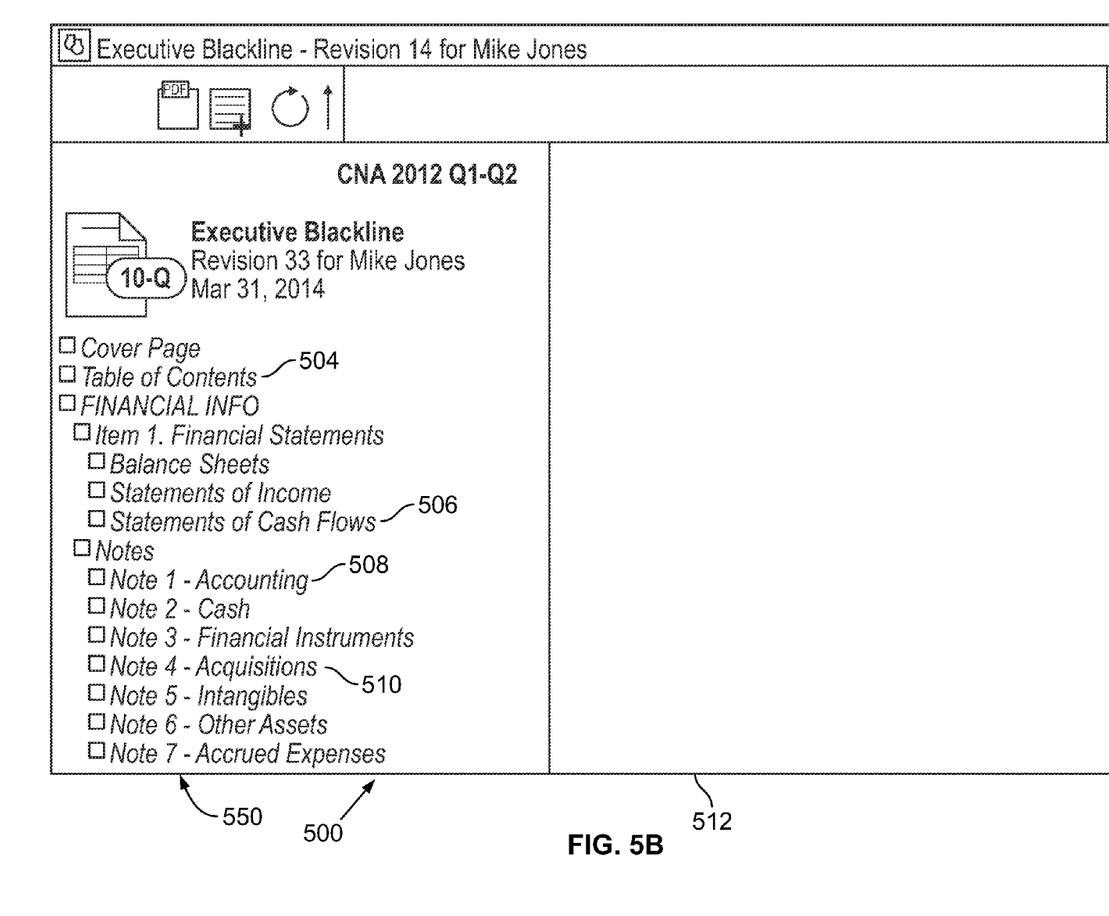

In this scenario, the editor 102 has completed Revision 14 of the document 106 (represented by the data structure DocumentRevision 212 of FIG. 2). The server 108 (executing the document collaboration program 210) informs the computing device 114 and the second computing device 118 that Revision 14 is ready for review. Referring to FIG. 5B, the server 108 prepares a section summary 550, a copy of which is displayed on the computing device 104 of the editor 102. In this example, the first and second reviewers 112 and 116 have not been active in the review process up to this point, so neither reviewer has reviewed any of the sections of this document. Thus, the document section summary 550 of FIG. 5B is what both reviewers will see when they log on to the document collaboration program 210. Note that each section title is italicized, indicating that all sections are new or updated and have not been reviewed.

Figure 7:
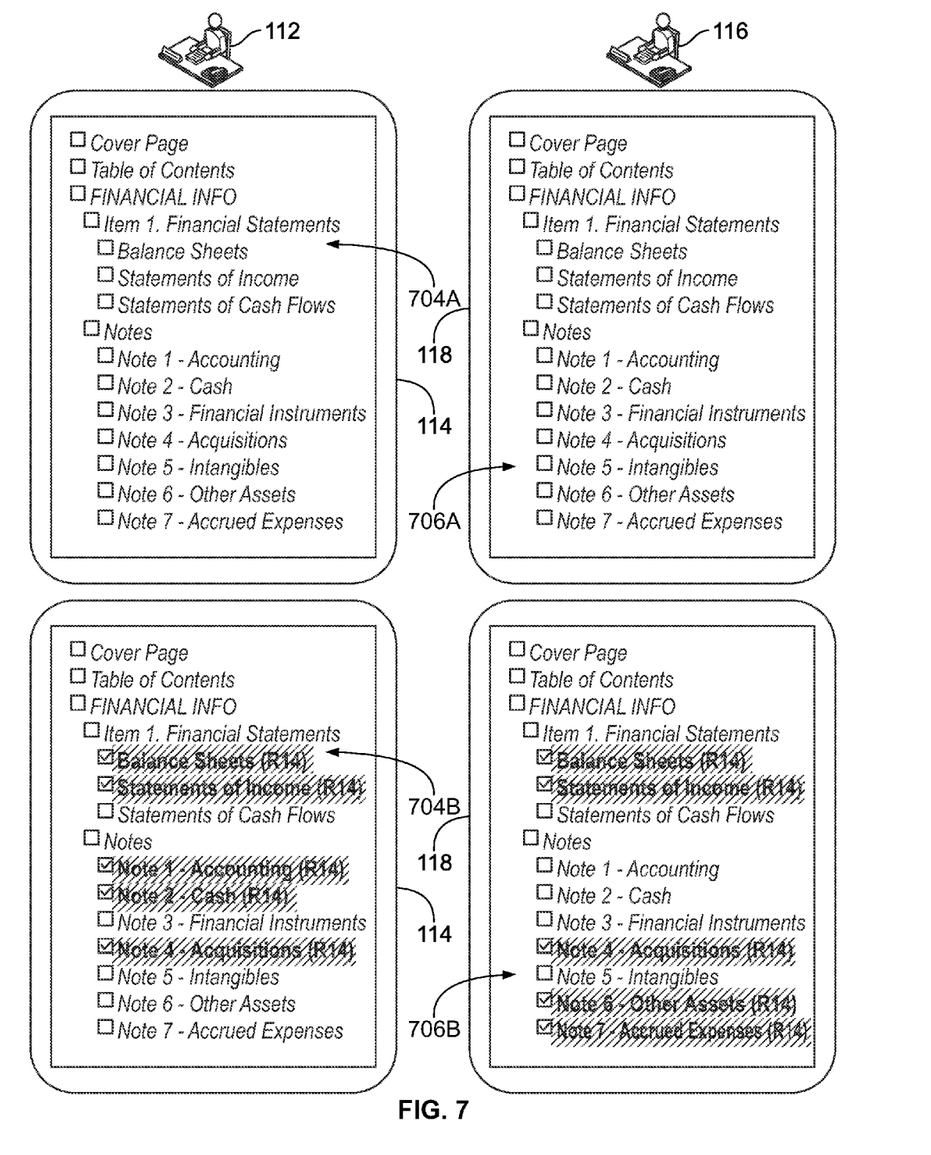
FIGS. 7-9 illustrate an example use case according to an embodiment.

The first reviewer 112 selects a section of Revision 14 (e.g., by tapping or clicking on the section title). The client application 314 (FIG. 3) responds by retrieving the selected section from the server 108 and displaying the section on the display 312 of the computing device 114 (e.g., in the second pane 512). The first reviewer 112 finishes reviewing that section (possibly annotating the section with notes), reviews other sections as desired, and checks the boxes of those sections that the reviewer 112 has approved. In effect, the first reviewer 112 now has his or her own document status summary, which is shown in FIG. 7 with reference numeral 704A (with the second pane 512 offscreen). In this example, the first reviewer 112 carries out the following actions with respect to each of the sections:

| | |
|---|---|
| Cover Page | Does not review |
| Table of Contents | Does not review |
| FINANCIAL INFO | Does not review |
| Item 1. Financial Statements | Does not review |
| Balance Sheets | Reviews and approves |
| Statements of Income | Reviews and approves |
| Statements of Cash Flows | Does not review |
| Notes | Does not review |
| Note 1 - Accounting | Reviews and approves |
| Note 2 - Cash | Reviews and approves |
| Note 3 - Financial Instruments | Does not review |
| Note 4 - Acquisitions | Reviews and approves |
| Note 5 - Intangibles | Does not review |
| Note 6 - Other Assets | Does not review |
| Note 7 - Accrued Expenses | Does not review |

As a section gets approved (checked off, in this example), the client application 314 appends the revision number to the section title to identify the revision that was approved. In some embodiments, the client application 314 also inserts a timestamp indicating the time and date of the review. The timestamp may be explicitly inserted next to the title of the reviewed section or may only appear when the cursor hovers over the section title. Once the first reviewer 112 has carried out these actions, the first reviewer 112's document status summary looks like that shown with reference numeral 704B in FIG. 7.

The second reviewer 116 goes through a similar process and interacts with his or her own individualized document status summary 706A as follows:

| | |
|---|---|
| Cover Page | Does not review |
| Table of Contents | Does not review |
| FINANCIAL INFO | Does not review |
| Item 1. Financial Statements | Does not review |
| Balance Sheets | Reviews and approves |
| Statements of Income | Reviews and approves |
| Statements of Cash Flows | Does not review |
| Notes | Does not review |
| Note 1 - Accounting | Does not review |
| Note 2 - Cash | Does not review |
| Note 3 - Financial Instruments | Does not review |
| Note 4 - Acquisitions | Reviews and approves |
| Note 5 - Intangibles | Does not review |
| Note 6 - Other Assets | Reviews and approves |
| Note 7 - Accrued Expenses | Reviews and approves |

Once the second reviewer 116 has carried out these actions, the second reviewer 116's document status summary looks like that shown with reference numeral 706B in FIG. 7.

The editor 102 receives input from various people, including possibly the first reviewer 112 and the second reviewer 116, and edits the document 106, making a new revision, which is Revision 23 in this example (represented by the DocumentRevision data structure 214 of FIG. 2). It will be assumed that the editor 102 has made changes to the Statements of Income section, the Statements of Cash Flows section, the Note 1—Accounting section, the Note 5—Intangibles, and the Note 7—Accrued Expenses section. The server 108 informs the computing device 114 and the computing device 118 that Revision 23 is ready for review, either at the prompting of the editor 102 or automatically.

Figure 8:
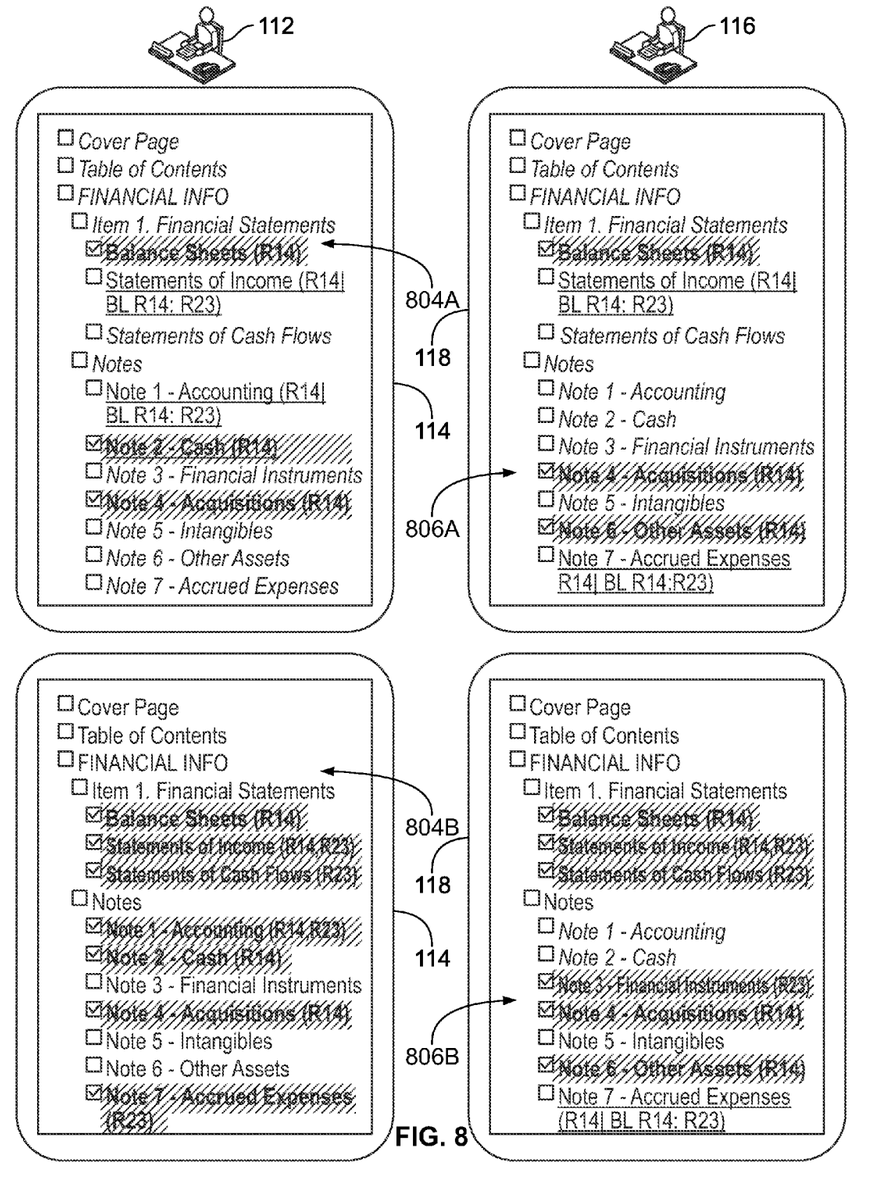

Referring to FIG. 8, the server 108 creates a first section summary 804A for the first reviewer 112 and a second section summary 806A for the second reviewer 116. When the first and second reviewers 112 and 116 logon to the document collaboration program 210 (i.e., using their respective computing devices 114 and 118, which are executing the client application 314), the server 108 transmits the first section summary 804A to the first reviewer 112's computing device 114, and transmits the second section summary 806A to the second reviewer 116's computing device 118. The respective computing devices 116 and 118 display the respective section summaries 804A and 806A.

The first section summary 804A conveys the following information to the first reviewer 112:

| | |
|---|---|
| Cover Page | First reviewer 112 has not reviewed this section |
| Table of Contents | First reviewer 112 has not reviewed this section |
| FINANCIAL INFO | First reviewer 112 has not reviewed this section |
| Item 1. Financial Statements | First reviewer 112 has not reviewed this section |
| Balance Sheets | No changes have been made since first reviewer 112 approved this section (on Revision 14) |
| Statements of Income | This section has been changed since the first reviewer 112 last reviewed it and a blacklined version of this sections versus the revision previously reviewed by the first reviewer 112 (Revision 14 in this example) is available. |
| Statements of Cash Flows | First reviewer 112 has not reviewed this section |
| Notes | First reviewer 112 has not reviewed this section |
| Note 1 - Accounting | This section has been changed since the first reviewer 112 last reviewed it and a blacklined version of this sections versus the revision previously reviewed by the first reviewer 112 (Revision 14 in this example) is available. |
| Note 2 - Cash | No changes have been made since first reviewer 112 approved this section (on Revision 14) |
| Note 3 - Financial Instruments | First reviewer 112 has not reviewed this section |
| Note 4 - Acquisitions | No changes have been made since first reviewer 112 approved this section (on Revision 14) |
| Note 5 - Intangibles | First reviewer 112 has not reviewed this section |
| Note 6 - Other Assets | First reviewer 112 has not reviewed this section |
| Note 7 - Accrued Expenses | First reviewer 112 has not reviewed this section |

The second section summary 806A conveys the following information to the second reviewer 116:

| | |
|---|---|
| Cover Page | Second reviewer 116 has not reviewed this section |
| Table of Contents | Second reviewer 116 has not reviewed this section |
| FINANCIAL INFO | Second reviewer 116 has not reviewed this section |
| Item 1. Financial Statements | Second reviewer 116 has not reviewed this section |
| Balance Sheets | No changes have been made since first reviewer 112 approved this section (on Revision 14) |
| Statements of Income | This section has been changed since the second reviewer 116 last reviewed it and a blacklined version of this sections versus the revision previously reviewed by the second reviewer 116 (Revision 14 in this example) is available. |
| Statements of Cash Flows | Second reviewer 116 has not reviewed this section |
| Notes | Second reviewer 116 has not reviewed this section |
| Note 1 - Accounting | Second reviewer 116 has not reviewed this section |
| Note 2 - Cash | Second reviewer 116 has not reviewed this section |
| Note 3 - Financial Instruments | Second reviewer 116 has not reviewed this section |
| Note 4 - Acquisitions | No changes have been made since first reviewer 112 approved this section (on Revision 14) |
| Note 5 - Intangibles | Second reviewer 116 has not reviewed this section |
| Note 6 - Other Assets | No changes have been made since first reviewer 112 approved this section (on Revision 14) |
| Note 7 - Accrued Expenses | This section has been changed since the second reviewer 116 last reviewed it and a blacklined version of this sections versus the revision previously reviewed by the second reviewer 116 (Revision 14 in this example) is available. |

To see a blacklined version of the two changed sections (Statements of Income section and Note 1—Accounting section), the first reviewer 112 may interact with the first section summary user interface 804A (e.g., by touching or clicking the title of the section the user wishes to review). In response, the computing device 114 transmits a request to the server 108 for the blacklined version of that section. The server 108 responds by transmitting the blacklined version to the computing device 114, which displays the blacklined version of the section on the display of the computing device 114.

Continuing with FIG. 8, the first reviewer 112 carries out the following actions with respect to each of the sections:

| | |
|---|---|
| Cover Page | Reviews but does not approve |
| Table of Contents | Reviews but does not approve |
| FINANCIAL INFO | Reviews but does not approve |
| Item 1. Financial Statements | Reviews but does not approve |
| Balance Sheets | (no action needed) |
| Statements of Income | Reviews and approves |
| Statements of Cash Flows | Reviews and approves |
| Notes | Reviews but does not approve |
| Note 1 - Accounting | Reviews and approves |
| Note 2 - Cash | (no action needed) |
| Note 3 - Financial Instruments | Reviews but does not approve |
| Note 4 - Acquisitions | (no action needed) |
| Note 5 - Intangibles | Reviews but does not approve |
| Note 6 - Other Assets | Reviews but does not approve |
| Note 7 - Accrued Expenses | Reviews and approves |

Once the first reviewer 112 has carried out these actions, the first reviewer 112's document status summary looks like that shown with reference numeral 804B.

The second reviewer 116 goes through a similar process and interacts with his or her own individualized document status summary 806A as follows:

| | |
|---|---|
| Cover Page | Reviews but does not approve |
| Table of Contents | Reviews but does not approve |
| FINANCIAL INFO | Reviews but does not approve |
| Item 1. Financial Statements | Reviews but does not approve |
| Balance Sheets | (no action necessary) |
| Statements of Income | Reviews and approves |
| Statements of Cash Flows | Reviews and approves |
| Notes | Reviews but does not approve |
| Note 1 - Accounting | Does not review |
| Note 2 - Cash | Does not review |
| Note 3 - Financial Instruments | Reviews and approves |
| Note 4 - Acquisitions | (no action necessary) |
| Note 5 - Intangibles | Reviews but does not approve |
| Note 6 - Other Assets | (no action necessary) |
| Note 7 - Accrued Expenses | Does not review |

Once the second reviewer 116 has carried out these actions, the second reviewer 116's document status summary looks like that shown with reference numeral 806B in FIG. 8.

Figure 9:
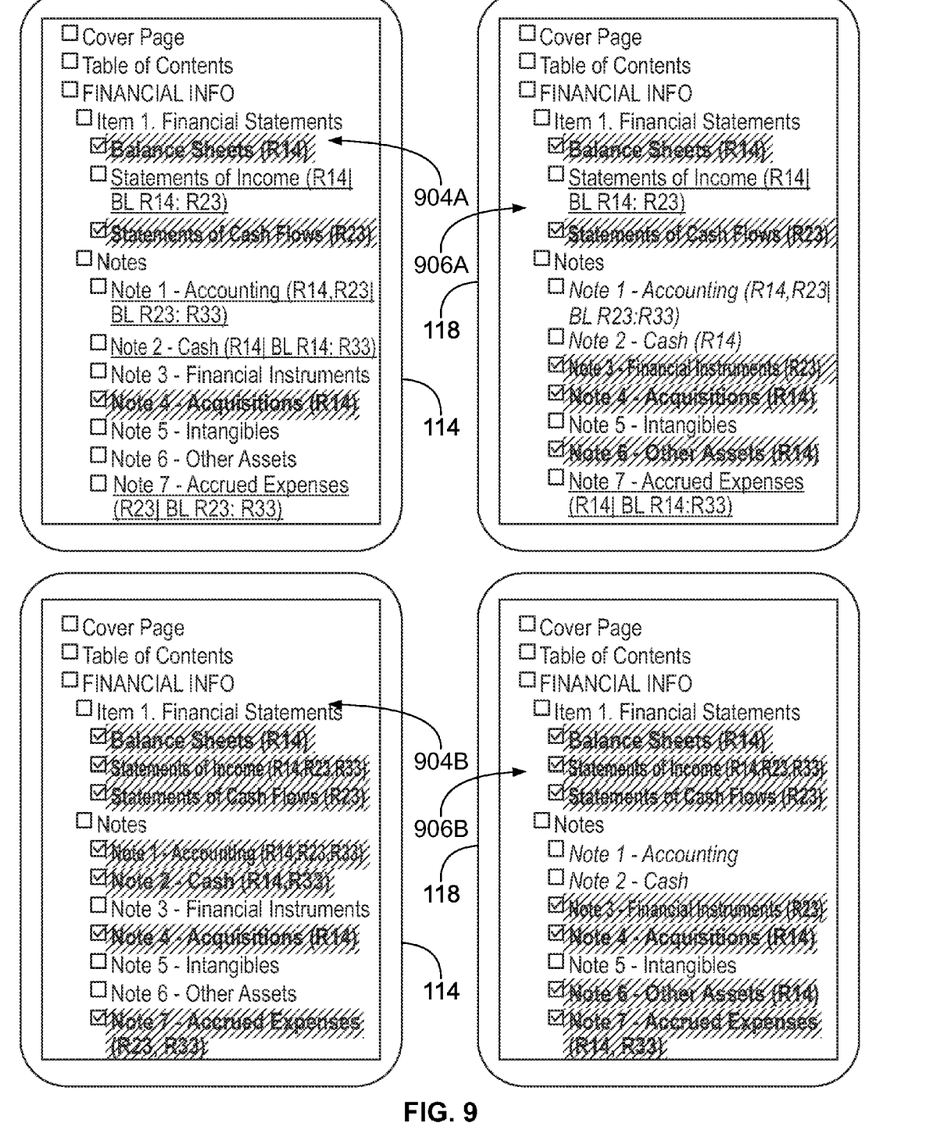

Referring to FIG. 9, the editor 102 once again edits the document 106, making a new revision, which is Revision 33 in this example. The server 108 creates a section summary user interface 904A for the editor 102, which the server 108 provides to the editor's computing device 104, and which the computing device 104 displays on the display 312. As shown in FIG. 9, the editor 102 has made changes to the Statements of Income section, the Note 1—Accounting section, the Note 2—Cash, and the Note 7—Accrued Expenses section. In response to prompting by the editor 102 or automatically, the server 108 informs the computing device 114 and the computing device 118 that Revision 33 is ready for review.

The first section summary 904A conveys the following information to the first reviewer 112:

| | |
|---|---|
| Cover Page | First reviewer 112 reviewed this section but has not approved it. |
| Table of Contents | First reviewer 112 reviewed this section but has not approved it. |
| FINANCIAL INFO | First reviewer 112 reviewed this section but has not approved it. |
| Item 1. Financial Statements | First reviewer 112 reviewed this section but has not approved it. |
| Balance Sheets | No changes have been made since first reviewer 112 approved this section (on Revision 14) |
| Statements of Income | This section has been changed since the first reviewer 112 last reviewed it and a blacklined version of this sections versus the revision previously reviewed by the first reviewer 112 (Revision 23 in this example) is available. |
| Statements of Cash Flows | No changes have been made since first reviewer 112 approved this section (on Revision 23) |
| Notes | First reviewer 112 reviewed this section but has not approved it. |
| Note 1 - Accounting | This section has been changed since the first reviewer 112 last reviewed it and a blacklined version of this sections versus the revision previously reviewed by the first reviewer 112 (Revision 23 in this example) is available. |
| Note 2 - Cash | This section has been changed since the first reviewer 112 last reviewed it and a blacklined version of this sections versus the revision previously reviewed by the first reviewer 112 (Revision 14 in this example) is available. |
| Note 3 - Financial Instruments | First reviewer 112 reviewed this section but has not approved it. |
| Note 4 - Acquisitions | No changes have been made since first reviewer 112 approved this section (on Revision 14). |
| Note 5 - Intangibles | First reviewer 112 reviewed this section but has not approved it. |
| Note 6 - Other Assets | First reviewer 112 reviewed this section but has not approved it. |
| Note 7 - Accrued Expenses | This section has been changed since the first reviewer 112 last reviewed it and a blacklined version of this sections versus the revision previously reviewed by the first reviewer 112 (Revision 23 in this example) is available. |

The second section summary 906A indicates the following to the second reviewer 116:

| | |
|---|---|
| Cover Page | Second reviewer 116 reviewed this section but has not approved it. |
| Table of Contents | Second reviewer 116 reviewed this section but has not approved it. |
| FINANCIAL INFO | Second reviewer 116 reviewed this section but has not approved it. |
| Item 1. Financial Statements | Second reviewer 116 reviewed this section but has not approved it. |
| Balance Sheets | No changes have been made since first reviewer 112 approved this section (on Revision 14) |
| Statements of Income | This section has been changed since the second reviewer 116 last reviewed it and a blacklined version of this sections versus the revision previously reviewed by the second reviewer 116 (Revision 23 in this example) is available. |
| Statements of Cash Flows | No changes have been made since the second reviewer 116 approved this section (on Revision 23) |
| Notes | Second reviewer 116 reviewed this section but has not approved it. |

| | |
|---|---|
| Note 1 - Accounting | Second reviewer 116 has not reviewed this section |
| Note 2 - Cash | Second reviewer 116 has not reviewed this section |
| Note 3 - Financial Instruments | No changes have been made since the second reviewer 116 approved this section (on Revision 23) |
| Note 4 - Acquisitions | No changes have been made since the second reviewer 116 approved this section (on Revision 14) |
| Note 5 - Intangibles | Second reviewer 116 reviewed this section but has not approved it. |
| Note 6 - Other Assets | No changes have been made since the second reviewer 116 approved this section (on Revision 14) |
| Note 7 - Accrued Expenses | This section has been changed since the second reviewer 116 last reviewed it and a blacklined version of this sections versus the revision previously reviewed by the second reviewer 116 (Revision 14 in this example) is available. |

Continuing with FIG. 9, the first reviewer 112 carries out the following actions with respect to each of the sections:

| | |
|---|---|
| Cover Page | First reviewer 112 does not review this section |
| Table of Contents | First reviewer 112 does not review this section |
| FINANCIAL INFO | First reviewer 112 does not review this section |
| Item 1. Financial Statements | First reviewer 112 does not review this section |
| Balance Sheets | (no action needed) |
| Statements of Income | Reviews and approves |
| Statements of Cash Flows | (no action needed) |
| Notes | First reviewer 112 does not review this section |
| Note 1 - Accounting | Reviews and approves |
| Note 2 - Cash | Reviews and approves |
| Note 3 - Financial Instruments | Reviews but does not approve |
| Note 4 - Acquisitions | (no action needed) |
| Note 5 - Intangibles | Reviews but does not approve |
| Note 6 - Other Assets | Reviews but does not approve |
| Note 7 - Accrued Expenses | Reviews and approves |

Once the first reviewer 112 has carried out these actions, the first reviewer 112's document status summary looks like that shown with reference numeral 904B in FIG. 9.

The second reviewer 116 goes through a similar process and interacts with his or her own individualized document status summary 906A as follows:

| | |
|---|---|
| Cover Page | Second reviewer 116 does not review this section |
| Table of Contents | Second reviewer 116 does not review this section |
| FINANCIAL INFO | Second reviewer 116 does not review this section |
| Item 1. Financial Statements | Second reviewer 116 does not review this section |
| Balance Sheets | (no action necessary) |
| Statements of Income | Reviews and approves |
| Statements of Cash Flows | (no action necessary) |
| Notes | Does not review |
| Note 1 - Accounting | Does not review |
| Note 2 - Cash | Does not review |
| Note 3 - Financial Instruments | (no action necessary) |
| Note 4 - Acquisitions | (no action necessary) |
| Note 5 - Intangibles | Does not review |
| Note 6 - Other Assets | (no action necessary) |
| Note 7 - Accrued Expenses | Reviews and approves |

Once the second reviewer 116 has carried out these actions, the second reviewer 116's document status summary looks like that shown with reference numeral 906B.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the have been described with reference to the figures, it will be understood by those of ordinary skill in the art that various changes in form and details may be made therein without departing from their spirit and scope of as defined by the following claims. For example, the steps of the flowcharts of FIGS. 4 and 6 can be reordered in ways that will be apparent to those of skill in the art.

What is claimed is:

1. A method, on a computing device, for facilitating the review of a document comprising a plurality of sections, the method comprising:
   receiving at least two sets of edits to a particular section of a document, resulting in a first version of the section, a second version of the section, and a third version of the section, the third version being the most current version, the third version being different from both the first and second versions;
   receiving a first reviewer's input of an approval of the second version;
   identifying that the second version is the most recent version of the section that the first reviewer reviewed;
   assembling a first individualized status summary of the document, wherein the first individualized status summary comprises an entry for the section within a list of the plurality sections, wherein the entry for the section identifies
   the number of the second version, which was approved by the first reviewer,
   the number of the third version of the section, and
   the availability of a first blacklined version of the section showing the changes between the second version of the section and the third version of the section,
   identifying that the first version is the most recent version of the section that the second reviewer reviewed;
   assembling a second individualized status summary of the document, wherein the second individualized status summary comprises an entry for the section within a list of the plurality sections, wherein the entry for the section identifies
   the number of the first version of the section,
   the number of the third version of the section, and
   the availability of a second blacklined version showing the changes between the first version of the section and the third version of the section;
   transmitting the first individualized status summary to the first reviewer; and transmitting the second individualized status summary to the second reviewer.

2. The method of claim 1, further comprising:
receiving, via the first individualized status summary, the first reviewer's selection of the previously-approved but changed section;
in response to the first reviewer's selection, transmitting the first blacklined version of the section to the first reviewer;
receiving, via the second individualized status summary, the second reviewer's selection of the previously-approved but changed section; and
in response to the second reviewer's selection, transmitting the second blacklined version of the section to the second reviewer.

3. The method of claim 1, further comprising:
receiving, via the first individual status summary, the first reviewer's approval of the third version;
receiving, via the second individual status summary, the second reviewer's approval of the third version;
updating the first individualized status summary to reflect the first user's approval; and
updating the second individualized status summary to reflect the second reviewer's approval.

4. The method of claim 3, wherein updating the first individualized status summary or the second individualized status summary comprises one or more of:
filling a checkbox next to a title of the section, displaying an icon representing a review status of the section, displaying graphics representing a review status of the section, and displaying graphics representing the approval status of the section.

5. The method of claim 1, wherein each of the first and second individualized status summaries further comprises, for each of the plurality of sections, a title of the section displayed in a manner that corresponds to the approval status of the section.

6. The method of claim 5, wherein the title of the section is displayed using a font, color, or text effect that corresponds to the approval status of the section.

7. The method of claim 5, wherein an icon or graphics representing the approval status of the section is displayed near the title of the section.

8. The method of claim 1, wherein, on each of the first and second individualized status summaries, the number of the revision against which the blacklined version is compared is displayed in the vicinity of the title of the section.

9. A method for facilitating review of a document comprising a plurality of sections, the method comprising, on a server:
receiving an indication from an editor of the document that the document is ready to be reviewed;
transmitting a first message to a first reviewer of the document indicating that the document is ready to be reviewed;
transmitting a first message to a second reviewer of the document indicating that the document is ready to be reviewed;
receiving, from a computing device of the second reviewer, but not from a computing device of the first reviewer, an indication that a first revision of a section of the plurality of sections has been reviewed, wherein the first revision is represented by a first data structure;
receiving a first set of edits to the section from the editor;
creating a second revision of the section, which includes the first set of edits, wherein the second revision is represented by a second data structure that is distinct from the first data structure;
generating a first blacklined version of the section based on a comparison between the second revision and the first revision;
transmitting a second message to the first reviewer indicating that the document is ready to be reviewed;
transmitting a second message to the second reviewer indicating that the document is ready to be reviewed;
transmitting, to the computing device of the first reviewer, a user interface comprising a summary of the plurality of sections, wherein the summary
  indicates the availability of the first blacklined version; and
  identifies the second revision to be the revision against which the first blacklined version is compared;
receiving, from the computing device of the first reviewer, but not from the computing device of the second reviewer, an indication that the second revision has been reviewed;
receiving a second set of edits to the section from the editor;
creating a third revision of the section, which includes the second set of edits, wherein the third revision is represented by a third data structure that is distinct from the first data structure and distinct from the second data structure;
generating a second blacklined version of the section based on a comparison between the first revision and the third revision;
transmitting a third message to the first reviewer indicating that the document is ready to be reviewed;
transmitting a third message to the second reviewer indicating that the document is ready to be reviewed;
transmitting, to the computing device of the first reviewer, a user interface comprising a summary of the plurality of sections, wherein the summary
  indicates the availability of the first blacklined version; and
  identifies the second revision to be the revision against which the second blacklined version is compared;
transmitting, to the computing device of the second reviewer, a user interface comprising a summary of the plurality of sections, wherein the summary
  indicates the availability of the second blacklined version; and
  identifies the first revision to be the revision against which the second blacklined version is compared;
receiving, via the user interface of the summary from the computing device of the first reviewer, an approval of the third revision of the section; and
receiving, via the user interface of the summary from the computing device of the second reviewer, an approval of the third revision of the section.

10. A computing device comprising:
a processor;
a network interface communicatively linked to a network, wherein the processor carries out actions to make different blacklined versions of the same section available to different reviewers, each of whom has reviewed different versions of the section, each version of the section being stored in different data structures, the actions comprising:
creating a first version of a section of the document;
receiving a first set of edits to the section from an editor, resulting in a second version of the section;

receiving a second set of edits to the section, including edits to the second version of the section, resulting in a third version of the section;

creating a first user interface for the first reviewer, the first user interface comprising a list of section titles, including
- a first section title that indicates, with information accompanying the title, that the section represented by the first section title has not yet been reviewed by the first reviewer,
- a second section title that indicates, with information accompanying the title, that the second version is the most recent version that has been previously reviewed by the first reviewer, that the third version is available for review, and that a blackline comparing the second and third versions of the section is available;

creating a second user interface for the second reviewer, the second user interface comprising a list of section titles, including
- a first section title that indicates, with information accompanying the title, that the section represented by the first section title has not yet been reviewed by the second reviewer,
- a second section title that indicates, with information accompanying the title, that the first version is the most recent version that has been previously reviewed by the second reviewer, that the third version of the section is available for review, and that a blackline comparing the first and third versions of the section is available;

receiving, via the first user interface, an input from the first reviewer on the second section title and, in response to the input, transmitting the blackline comparing the second and third versions of the section to the first reviewer;

receiving, via the second user interface, an input from the second reviewer on the second section title and, in response to the input, transmitting the blackline comparing the first and third versions of the section to the second reviewer.

11. The computing device of claim 10, wherein the processor executes instructions for carrying out actions comprising:

receiving, via the first user interface, the first reviewer's approval of the third version;

receiving, via the second user interface, the second reviewer's approval of the third version;

updating the second section title on the first user interface to reflect the first user's approval;

updating the second section title on the second user interface to reflect the second user's approval.

12. The computing device of claim 11, wherein the title of the second section is updated using a font, color, or text effect that corresponds to the availability of a blacklined version.

13. The computing device of claim 11, wherein the title of the second section is updated with an icon or graphics representing the approval status of the section.

14. The computing device of claim 11,
wherein the processor visually indicates the availability of the blacklined version of the second section on the first user interface by changing the color of the font of the title of the second section on the first user interface and adding the identity of the versions being compared in blacklined version in the vicinity of the title of the second section,
wherein the processor visually indicates the availability of blacklined version of the second section on the second user interface by changing the color of the font of the title of the second section on the second user interface and adding the identity of the versions being compared in the blacklined version in the vicinity of the title of the second section.

\* \* \* \* \*

UNITED STATES PATENT AND TRADEMARK OFFICE
CERTIFICATE OF CORRECTION

PATENT NO.        : 9,442,908 B2
APPLICATION NO.   : 14/305172
DATED             : September 13, 2016
INVENTOR(S)       : Arndorfer et al.

It is certified that error appears in the above-identified patent and that said Letters Patent is hereby corrected as shown below:

On the Title Page

Item (72) Inventors should read:
Brent Richard Arndorfer, Mesa, AZ (US)
Matthew James Heying, Arlington, VA (US)
Daniel James Murray, Ames, IA (US)
Scott Johns Bacon, Thorton, CO (US)
Anthony Ryan Oskvarek, Centennial, CO (US)
Stephen M. Siegel, Ames, IA (US)
Edward Joseph Cupps, Nevada, IA (US)

Signed and Sealed this
Fifth Day of September, 2017

Joseph Matal
*Performing the Functions and Duties of the*
*Under Secretary of Commerce for Intellectual Property and*
*Director of the United States Patent and Trademark Office*